United States Patent
Rankl et al.

(10) Patent No.: US 9,413,428 B2
(45) Date of Patent: Aug. 9, 2016

(54) TRANSACTION SYSTEM

(71) Applicant: GIESECKE & DEVRIENT GMBH, Munich (DE)

(72) Inventors: Wolfgang Rankl, Munich (DE); Klaus Finkenzeller, Unterfohring (DE)

(73) Assignee: GIESECKE & DEVRIENT GMBH, Munich (DE)

( * ) Notice: Subject to any disclaimer, the term of this patent is extended or adjusted under 35 U.S.C. 154(b) by 24 days.

(21) Appl. No.: 14/349,864

(22) PCT Filed: Oct. 4, 2012

(86) PCT No.: PCT/EP2012/004157
§ 371 (c)(1),
(2) Date: Apr. 4, 2014

(87) PCT Pub. No.: WO2013/050152
PCT Pub. Date: Apr. 11, 2014

(65) Prior Publication Data
US 2014/0287683 A1   Sep. 25, 2014

(30) Foreign Application Priority Data

Oct. 6, 2011   (DE) .......................... 10 2011 114 989

(51) Int. Cl.
*H04W 4/00* (2009.01)
*H04B 5/00* (2006.01)
*G06Q 20/32* (2012.01)
(Continued)

(52) U.S. Cl.
CPC .......... *H04B 5/0031* (2013.01); *G06Q 20/3278* (2013.01); *G06Q 20/352* (2013.01); *G06Q 30/0601* (2013.01)

(58) Field of Classification Search
CPC ...... H04W 4/008; H04W 84/047; H04B 7/14; H04B 7/15507
USPC ...................................... 455/41.1, 41.2, 41.3
See application file for complete search history.

(56) References Cited

U.S. PATENT DOCUMENTS

| | | |
|---|---|---|
| 2008/0058014 A1 | 3/2008 | Khan et al. |
| 2008/0128513 A1 | 6/2008 | Hammad et al. |
| 2009/0070272 A1 | 3/2009 | Jain |

(Continued)

OTHER PUBLICATIONS

Finkenzeller, "RFID Handbuch Grudlagen und Praktische Anwendungen von Transpondern, Kontaktlosen Chipkarten und NFC," 5th edition, Chapter 11.6, pp. 388-395, 2008, Hanser Verlag, Munich. Published in English under Finkenzeller, "RFID Handbook Fundamentals and Applications in Contactless Smart Cards, Radio Frequency Identification and Near-Field Communication," 3rd Edition, Chapter 11.6, pp. 339-346, 2010, John Wiley & Sons Ltd., Chichester, GB.

(Continued)

*Primary Examiner* — Wen Huang
(74) *Attorney, Agent, or Firm* — Workman Nydegger

(57) ABSTRACT

A transaction system has a terminal device contactlessly communicating in the near zone for carrying out transactions with transaction partners disposed in the near zone. A relay end device is arranged to set up a contactless data communication with the terminal device and to relay transaction data received from the terminal device to a remotely disposed transaction unit. A server device switches the relay end device with the transaction unit as a transaction partner for the terminal device, depending on the type of the transaction.

15 Claims, 7 Drawing Sheets

(51) Int. Cl.
*G06Q 30/06* (2012.01)
*G06Q 20/34* (2012.01)

(56) References Cited

U.S. PATENT DOCUMENTS

| | | |
|---|---|---|
| 2009/0143104 A1 | 6/2009 | Loh et al. |
| 2009/0157512 A1* | 6/2009 | King ............................... 705/14 |
| 2010/0153721 A1 | 6/2010 | Mellqvist |
| 2011/0029777 A1* | 2/2011 | Murakami et al. ............ 713/171 |
| 2011/0117844 A1* | 5/2011 | Fujita ..................... H04B 7/155 |
| | | 455/41.2 |
| 2012/0084132 A1* | 4/2012 | Khan ......................... 705/14.26 |
| 2012/0264375 A1* | 10/2012 | Shankaranarayanan ..... 455/41.2 |

OTHER PUBLICATIONS

German Search Report for corresponding German Application No. 102011114989.2, created on May 29, 2012.

International Search Report for corresponding International PCT Application No. PCT/EP2012/004157, mailed Mar. 7, 2013.

* cited by examiner

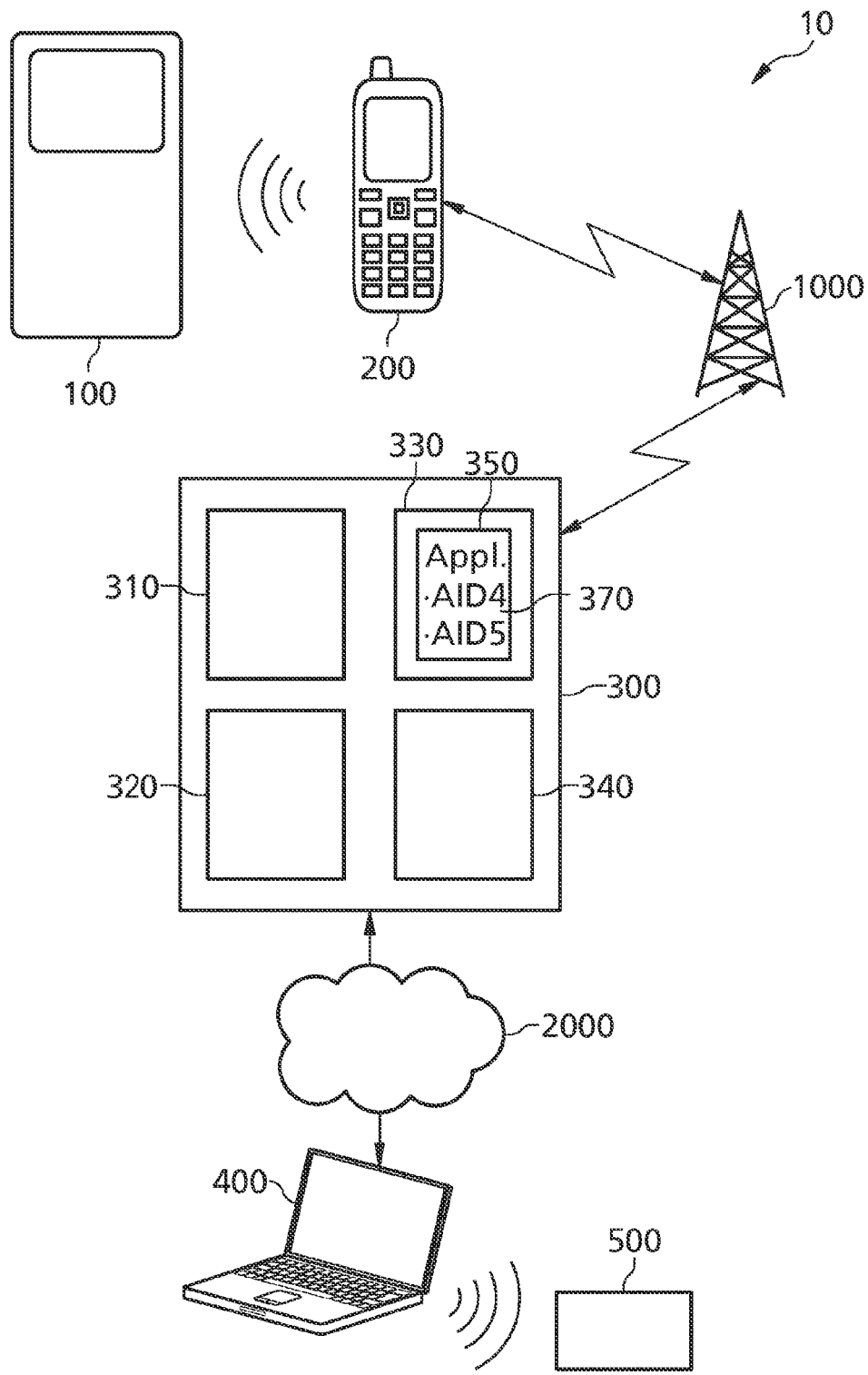

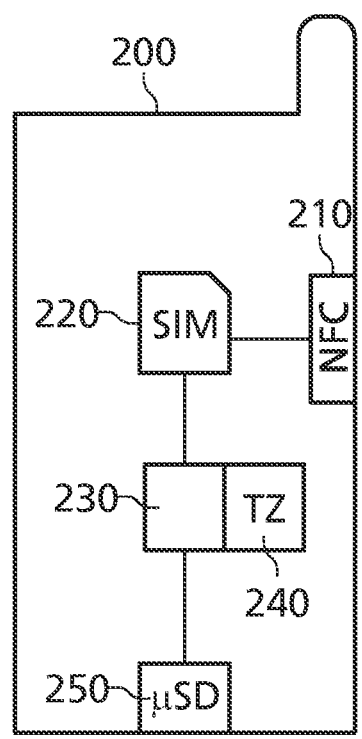

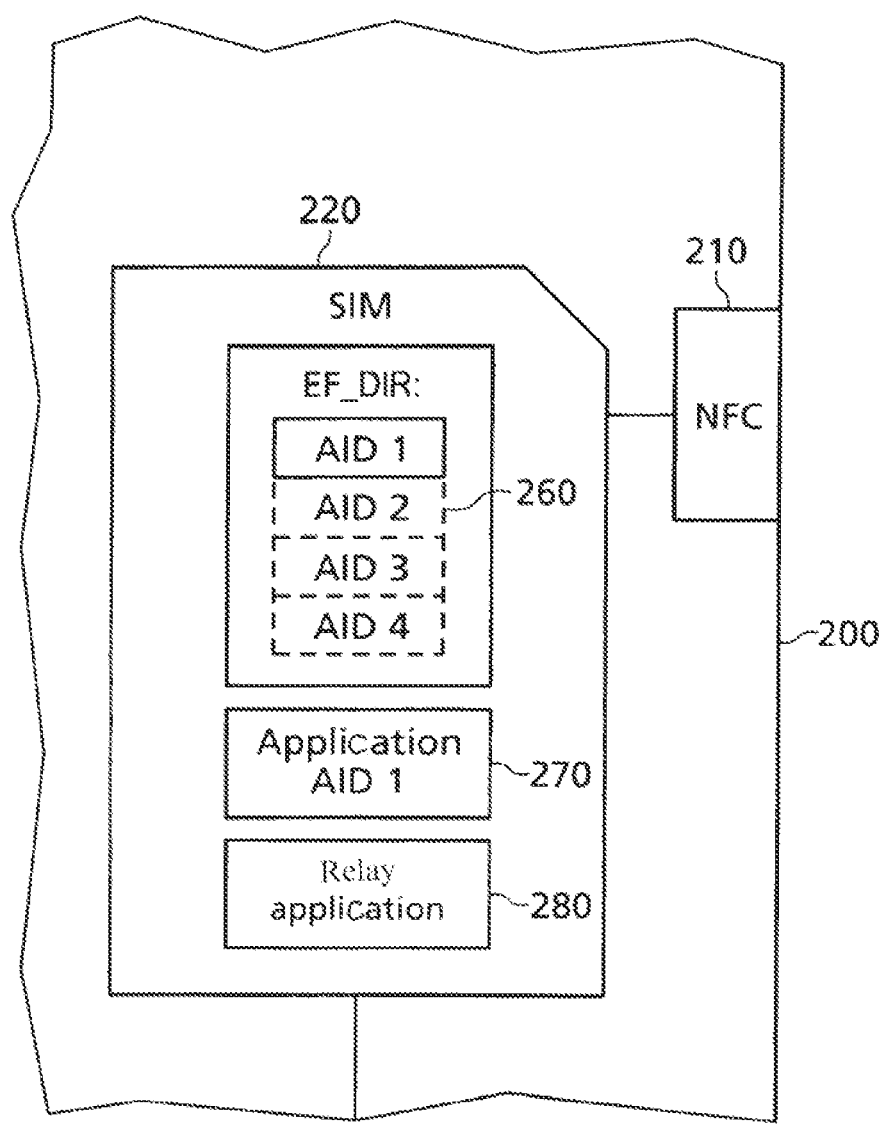

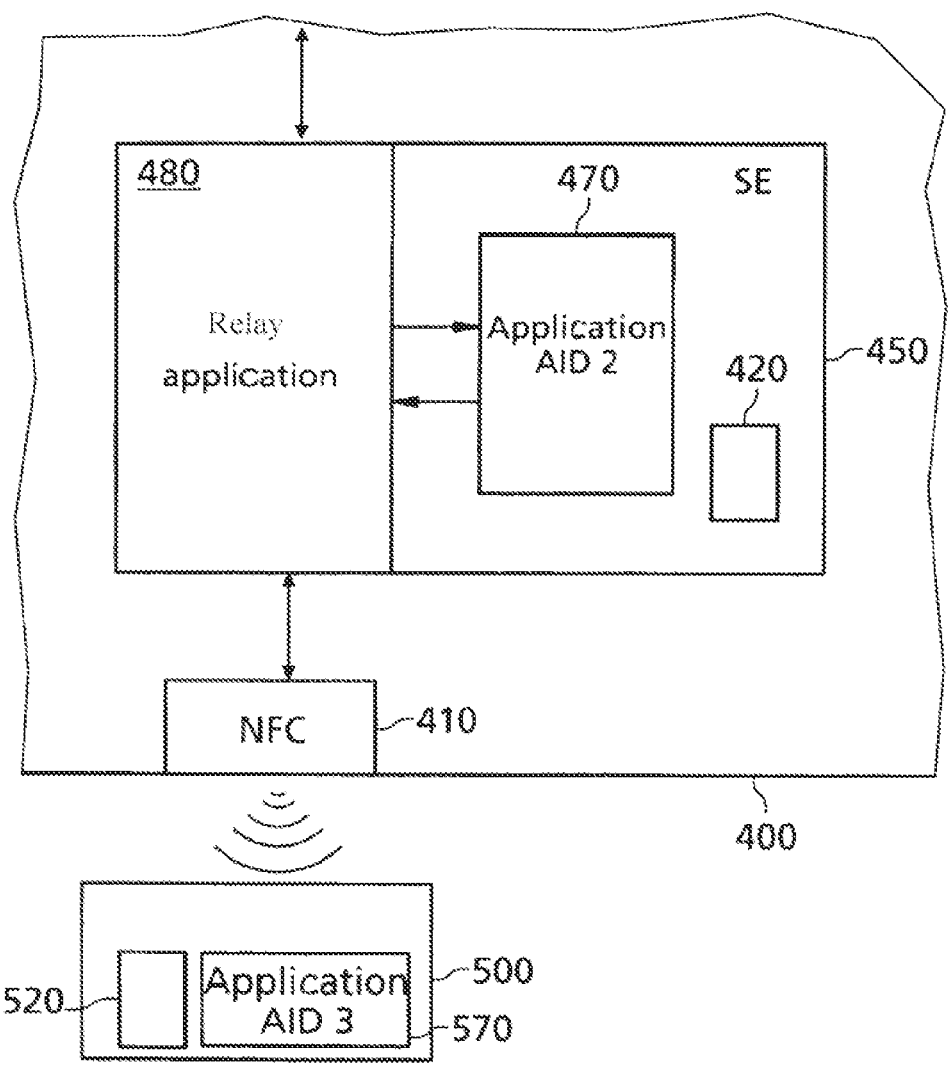

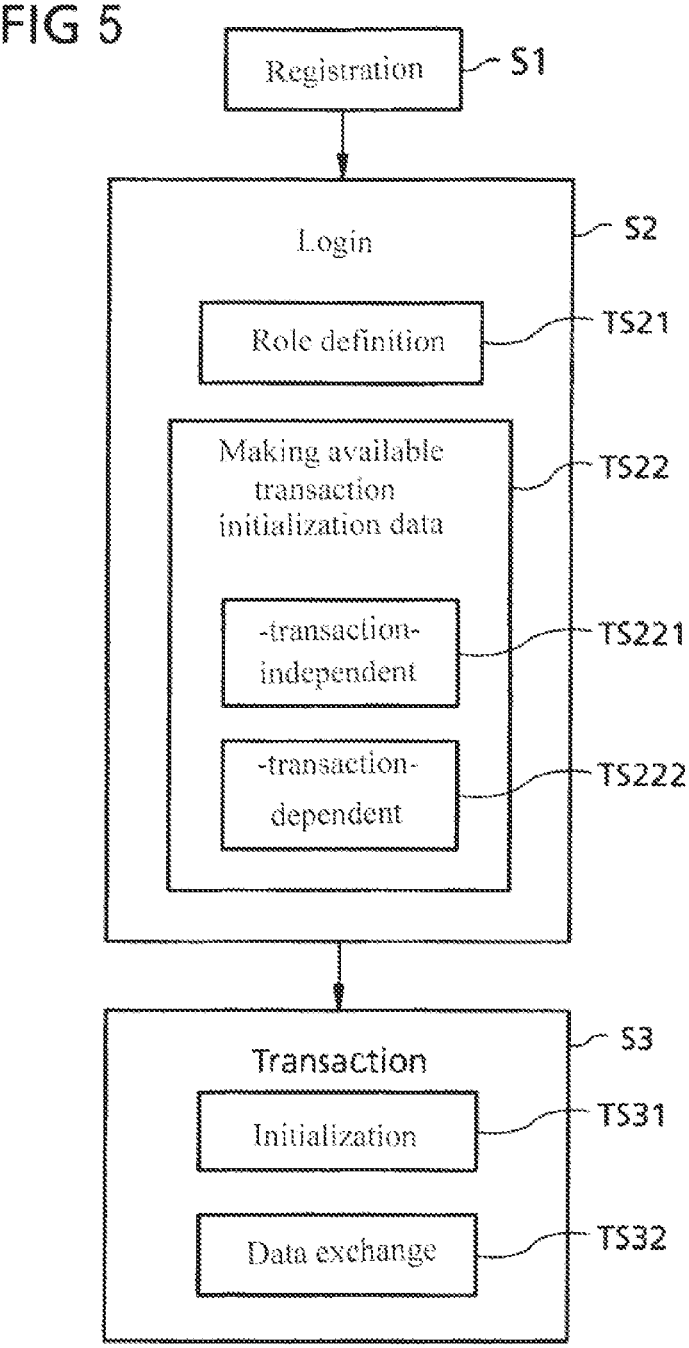

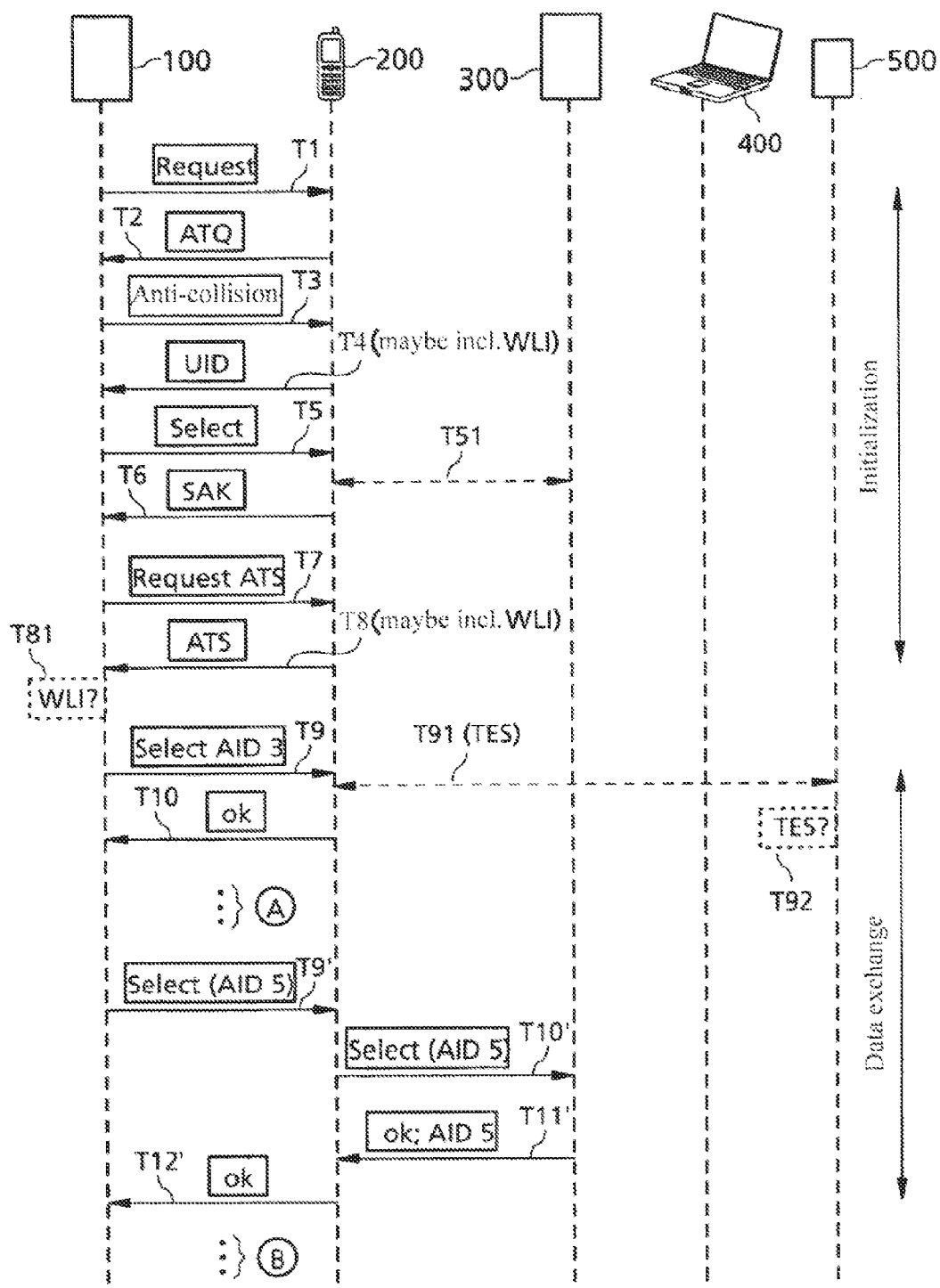

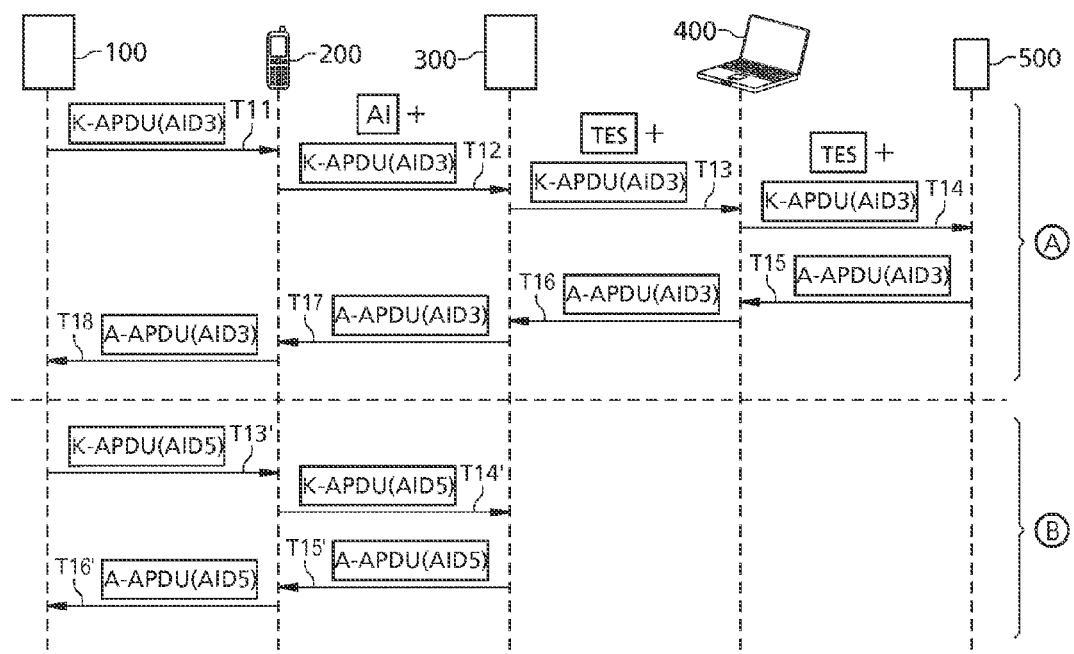

TRANSACTION SYSTEM

BACKGROUND

The present invention relates to a method for carrying out a transaction with a contactlessly communicating terminal device as well as to a corresponding transaction system and associated components.

SUMMARY

Transaction systems which support various transactions by contactless means, for example cashless payment, ticketing uses, access control or the like, are well-known. The transaction here is normally carried out between a contactlessly communicating terminal device and a contactlessly communicating portable data carrier of a user, for example a chip card. Occasionally, it is already possible that a transaction application which is otherwise executed on a chip card can be installed on a security element of a mobile radio end device. The mobile radio end device supports in this case a contactless data communication with the terminal device, for example by means of a so-called CLFs ("contactless frontend"). The basis here is formed by known contactless data transmission protocols, such as e.g. according to ISO/IEC 14443 (contactless chip card) or the NFC protocol ("Near Field Communication") according to ISO/IEC 18092 (NFCIP-1) or ISO/IEC 21481 (NFCIP-2) in connection with NFC-capable mobile radio end devices or the like.

However, it is disadvantageous for a user here, that in most cases for each use a separate terminal device is provided, which in turn requires an associated, separate data carrier—in the case of a chip card—or at least a corresponding separate transaction application—in the case of an NFC-capable mobile radio end device. Thus, if the user wants to carry out various transactions, he must have with himself the respectively suitable portable data carrier or at least first install the suitable transaction application on the security element of his mobile radio end device. The number of necessary chip cards rises quickly here. An installation of diverse transaction applications requires at least some effort and quickly leads to a confusingly large number here too. Furthermore, the installation in most cases is to be carried out beforehand, i.e. not in the moment the user wants to employ the application for example for using the underground train in a foreign city. Finally, it is required, if a transaction application is to support a payment transaction on a data carrier, that in each case a sufficient credit is stored on the respective data carrier. If payment is to be effected by invoice, then even a contract between user and provider must be concluded in advance.

It is therefore the object of the present invention to propose a transaction system and a method which accounts for the mentioned disadvantages.

This object is achieved by the subject matter of the independent claims. Advantageous realizations and developments are stated in the dependent claims.

A transaction system comprises a terminal device contactlessly communicating in the near zone, a relay end device, a server device, and a transaction unit disposed remotely from the terminal device. The terminal device is arranged to carry out transactions with transaction partners disposed in the near zone. The relay end device is arranged to set up a contactless data communication with the terminal device and to relay transaction data received from the terminal device to the remotely disposed transaction unit. The server device is arranged to switch (to put in contact, to bring together) the relay end device with the transaction unit as a transaction partner for the terminal device, depending on the transaction type. Depending on the transaction type, the server device accordingly switches different transaction units (and for the transaction with the terminal device the mentioned transaction unit). Accordingly, the server device provides at least one transaction unit for each transaction type. If the transaction is of a first transaction type, the server device thus switches a first transaction unit with the relay end device, but if the transaction is of a second transaction type, the server device switches a second transaction unit with the relay end device.

The server device is in particular arranged to choose the transaction unit from a multiplicity of transaction units. For each transaction type at least one transaction unit is provided here. The step of choosing comprises a choice depending on the transaction type. Moreover, the transaction unit can be chosen from the transaction units provided for the transaction type.

The transaction type is specified by the terminal device. Either the terminal device supports only one transaction type or it transmits the specified transaction type to the relay end device.

The server device stores various registration data for transaction units. It stores in particular which transaction type is supported by the transaction unit and with which address a data communication connection can be set up (via a network) to the transaction unit.

The switching of the transaction unit can be effected by setting up a data communication connection to the transaction unit (with the aid of the address) and by relaying transaction data from the relay end device via the server device to the transaction unit. Alternatively, the switching can be effected by transmitting the data communication address of the transaction unit to the relay end device.

The transaction that is not effected in the near zone but whose transaction data are relayed to a remotely disposed transaction unit is also referred to as relayed transaction. In a realization, the server device itself can comprise transaction units for different transaction types. The relayed transaction is advantageously carried out with one of the transaction units of the server device. In particular when conventional contactless portable data carriers serve as transaction units of the server device, the server device is to be made available effectively.

Within the framework of the described transaction system it can be provided that a relay end device and/or a transaction unit registers with the server device respectively once. The respective device (or the unit) transmits, upon registration at the server device, for example a unique designation to the server device, by means of which in the following the respective device (or the unit) can be identified or addressed. As a designation there can be employed for example a mobile radio number, a network address (e.g. an IP address), an account or the like.

During the registration there can for example already be defined, which relay end device, where applicable via the server device, can be or is to be potentially connected with which transaction unit/s for subsequently carrying out a transaction. If such a pairing of relay end device and transaction unit is formed in this phase, the server device can make available to the relay end device data relating to the transaction unit already at this time, which data the relay end device can later employ upon setting up a data communication connection with the terminal device.

It is further advantageous, when the server device stores for transaction units, with which relay end devices the transaction unit may be switched. Such specifications of the owner of the transaction unit allow, for example, that the relayed transaction does not have to be additionally billed. The owner (father, head of department) of a transaction unit (with the use: stripe ticket or purse) states upon the registration, which relay end devices of a group of people (family, department) are allowed to execute (free of charge) relayed transactions with the transaction unit.

The (basically complete) transaction system of the specified transaction type can be referred to as transaction subsystem, for delimitation over the present transaction system. Each transaction subsystem consists of a multiplicity of terminal devices and transaction units as well as a billing unit. The present transaction system does not have to be a metasystem for the transaction subsystems, thus needs no knowledge of the construction thereof and requires no interfaces into the subsystems. It can be operated as an independent transaction system, which extends the field of use of the transaction subsystems.

The server device can comprise a billing balance unit. The relayed transaction triggers in the transaction subsystem a billing between the terminal operator and the owner of the transaction unit. The billing balance unit now in turn triggers a billing at the expense of the user of the relay end device. A billing for the user of the relay end device might also be effected directly with the owner of the transaction unit. It is substantially more elegant and more anonymous, however, to trigger a separate billing between the user of the relay end device and the operator of the present transaction system as well as between the operator of the present transaction system and the owner of the transaction unit.

The server device makes available to the relay end device (s) transaction initialization data. Transaction initialization data can comprise, for example, relay information, an identifier (AIDs) of the supported transaction type and/or an address of the transaction unit for the transaction type.

In this way, the relay end device becomes multi-application-capable in a certain sense without one single transaction application having to be installed on the relay end device. The transaction application itself is made available by the remote transaction unit. Vis-à-vis the terminal device the relay end device seems to be respectively arranged to execute a specified transaction application. A user of the relay end device thus has at his disposal a multiplicity of transaction applications for carrying out a great variety of applications via the relay end device, which is simply equipped by means of a relay application, in connection with the server device.

A server device of the invention accordingly comprises a data communication interface for the data communication with the relay end device and is arranged to make available to the relay end device transaction-dependent transaction initialization data.

The server device determines the transaction type preferably with the help of information received from the relay end device. The information can be, for example, an application identifier (AID) or position information (number of a mobile radio cell, GPS data, . . . ). The server device can determine the transaction type with the help of position information (received from the relay end device or otherwise ascertained), which indicates the position of the relay end device. The relay end device is arranged to relay identification information relating to a transaction application to the server device.

The server device can make available to the relay end device transaction-dependent transaction initialization data, if required. This can be effected in an upstream step, for example during an above-described registration phase. Preferably in the initialization phase at least a part of the transaction initialization data is transmitted from the relay end device to the terminal device. The transaction initialization data can comprise here, e.g., a unique identification date of a transaction unit, to which the relay end device relays the data communication set up with the terminal device, or of the relay end device itself. Alternatively or additionally, also transaction parameters depending on the transaction unit can be part of the transaction initialization data. These transaction parameters normally relate to the transaction unit, to which the relay end device relays the communication connection set up with the terminal device.

These transaction initialization data can comprise the relay information. For this purpose, for example, a specific values range of designations—corresponding to the identification date—can be reserved for relay end devices. A terminal device to which the corresponding values range is known can thus recognize a relay end device to be an end device arranged for relaying transaction data already by its unique identification date. It is also possible that data sets which are provided for coding manufacturer-specific parameters of transaction units comprise relay information.

The relay end device comprises a data communication interface for the contactless data communication in the near zone with the terminal device as well as a data communication interface for the data communication with the server device. The relay end device comprises a relay application which is arranged to transmit the transaction data to the transaction unit. The relay application is made available to the relay end device preferably by the server device.

As a relay end device there can be employed, for example, a reading device for contactless and or contact-type chip cards, a mobile radio end device, a smartphone, a notebook or the like. The transaction data are relayed via a network (Internet, mobile radio network, LAN, . . . ). The data communication between the relay end device and the server device, between the relay end device and the transaction unit and/or between the server device and the transaction unit can be effected via a suitable communication network, e.g. a mobile radio network, the Internet or the like. The data communication between the terminal device and the relay end device is a contactless (near-zone) data communication in the near zone of the terminal device. This data communication is normally effected via one of the above-mentioned, known contactless data transmission protocols, such as for example ISO/IEC 14443, ISO/IEC 18092 (NFCIP-1) or ISO/IEC 21481 (NFCIP-2).

The relay end device can carry out the transaction, depending on the transaction type, as the relaying unit or as the transaction unit. In particular, the relay end device is arranged to carry out transactions of different transaction types as the relaying unit.

Two great advantages of the transaction system are its flexibility and its backward compatibility. The exchange of the transaction data with the relay end device is effected according to a specified procedure for transaction units disposed in the near zone. Neither the terminal device nor the transaction unit necessarily require adaptation.

Rather, the exchange of the transaction data is to further follow the specified procedure, even when a relaying takes place. When the terminal device recognizes the relay end device as the relaying unit with the help of the relay information, there is thus carried out a corresponding preparation step in the terminal device before the exchange of the transaction data.

The transaction system normally comprises a plurality of relay end devices, a plurality of—also different—terminal devices as well as, where applicable, a plurality of transaction units which in turn can be arranged to respectively execute a plurality of transaction applications themselves.

The terminal device is basically arranged to carry out a transaction with a transaction unit. In so doing, a contactless data communication between the terminal device and the transaction unit is set up. This data communication can be relayed and switched via various further components of the transaction system, as already indicated and as it will be described in detail hereinafter.

The transaction unit generates transaction data necessary for carrying out the transaction. It is arranged to execute a transaction application which is assigned to a transaction type specified by the terminal device. For different transactions (transaction types) accordingly different transaction units or a transaction unit with accordingly different transaction applications are used.

The transaction unit can be a transaction unit (independent of,) remotely disposed from the server device, an internal transaction unit of the server device or a separate transaction unit assigned to the server device. Preferably, as a separate transaction unit of the server device there is used a hardware security module that is reversibly inserted or firmly installed. Preferably, as a remotely disposed transaction unit there is employed: a hardware security module as a separate unit (chip card, USB token, secure mass memory card . . . ), a hardware security module reversibly inserted in an end device (chip card in particular SIM card, USB token, secure mass memory card), a hardware security module firmly installed in an end device, a virtual security module in an end device or a secure runtime environment of an end device.

The server device is arranged, as mentioned above, to make available to the relay end device transaction-dependent transaction initialization data. The transaction-dependent transaction initialization data can contain, on the one hand, information about which transactions are supported by the relay end device—via the support of the server device which remains transparent to a terminal device.

On the other hand, the transaction-dependent transaction initialization data can also serve for enabling the relay end device to carry out at least portions of the transaction on the relay device itself without the need for relaying transaction data to the server device for this purpose. In this way, communication periods can be shortened and the occurrence of "timeout" errors between the terminal device and the relay end device as a result of a delayed response on the part of the relay end device to commands of the terminal device can be avoided. This does not cause any additional effort for the user of the relay end device. The transaction initialization data are made available by the server device preferably automatically on the relay end device, without this requiring an interaction with the user.

The relay end device can be arranged to request transaction-dependent transaction initialization data from the server device. This is e.g. necessary, when a terminal device chooses a corresponding transaction application within the framework of a set up data communication, but the relay end device has not yet been prepared for this, i.e. "does not know" the requested application. Upon request of the relay end device, the server device then makes available the corresponding transaction-dependent transaction initialization data. For this purpose, the commenced data communication between the terminal device and the relay end device does normally not have to be interrupted.

But it is also possible, that the server device makes available to the relay end device in advance, for example within the framework of an above-described registration, transaction-dependent transaction data for transactions that are expected to be executed subsequently. This has the advantage that the transaction can then be carried out faster with the terminal device and with less recourse to the server device.

The server device is also arranged to make available to the relay end device transaction-independent transaction initialization data. These serve for efficiently setting up a data communication connection with the terminal device in an initial phase preceding a transaction phase. These transaction-independent transaction initialization data likewise are made available to the relay end device preferably in advance, e.g. during the registration, by the server device.

BRIEF DESCRIPTION OF THE DRAWINGS

Hereinafter the invention will be described by way of example with reference to the attached drawings. Therein are shown:

FIG. 1 an embodiment of a transaction system;

FIG. 2 schematically various security elements of a relay end device;

FIG. 3 a section of the internal structure of the relay end device of FIG. 2;

FIG. 4 a section of the internal structure of a transaction end device in connection with a portable data carrier;

FIG. 5 an overview of substantial steps of a transaction method (registration, login, transaction);

FIGS. 6 and 7 individual steps within the framework of the transaction of FIG. 5 between a terminal device and further devices involved in the transaction.

DETAILED DESCRIPTION OF VARIOUS EMBODIMENTS

With reference to FIG. 1 the shown transaction system 10 comprises a terminal device 100, a relay end device 200, a server device 300, a transaction device 400 as well as a portable data carrier 500.

In embodiments of the transaction system 10 described hereinafter one can do without individual ones of the components, for example the data carrier 500, or this data carrier and the transaction end device 400.

For clarity's sake each of the components is represented only once in FIG. 1. Normally, however, the transaction system 10 comprises one or few interconnected server devices 300, a plurality of terminal devices 100, a plurality of relay end devices 200 and, where applicable, a plurality of transaction end devices 400, it being possible that each of these transaction end devices 400 is optionally connected with a plurality of portable data carriers 500.

A terminal device 100 is arranged to carry out via a contactless data communication a transaction with a device arranged therefor. This device must here be capable of setting up a data communication with the terminal device 100 and making available a transaction application which is assigned to a transaction specified by the terminal device 100. The terminal device 100 can be arranged for example to be an access control system, a ticket terminal in public transport, a payment terminal or the like. The corresponding transaction then corresponds to an authentication application, possibly connected with the proof of a paid entrance fee, or to the payment application of a specified service, for example the use of means of public transport or the like. Within the framework of a payment application there is then debited for example an electronic purse which is stored on the transaction unit.

It is known to employ contactlessly communicating portable data carriers 500, for example chip cards, as devices for carrying out such transactions. Here, the corresponding transaction application is respectively stored on such a data carrier 500. For each of the numerous different transactions which can be carried out vis-à-vis a terminal device 100 of the described type there is normally made available a separate data carrier 500 assigned to the corresponding terminal device 100. This results in the fact that a user, if he wants to carry out various transactions at various terminals, must have with himself the respectively associated portable data carriers. Additionally, it must be heeded that corresponding purses, which are debited upon payment transactions, always have sufficient funds.

Alternatively, individual ones of the transaction applications can be installed to be executable on a transaction end device 400, for example a mobile radio end device. This can then act, a suitable data communication interface given, vis-à-vis the terminal device 100 like a data carrier 500 and carry out a desired transaction. For the user it is disadvantageous here that a desired transaction application in most cases has to be installed beforehand and, where applicable, an associated purse must be topped up. A spontaneous use, in particular a first-time or only one-time use of a hitherto unknown transaction application, for example the use of a means of public transport in a foreign city visited the first time, is then not possible, because the corresponding transaction application is not installed on the carried transaction end device 400.

The transaction system 10 represented in FIG. 1 can support advantageous transaction methods described hereinafter, by means of which the described disadvantages of known transaction systems can be avoided.

A relay end device 200 is disposed in the near zone of the terminal device 100 and arranged to set up a data communication connection with the terminal device 100. Transaction data relating to a transaction are not processed by the relay end device 200 but relayed to a remotely disposed transaction unit. Accordingly, the relay end device 200 is arranged to relay data received from the transaction unit to the terminal device 100. The relay end device 200 comprises for this purpose a relay application 280, which is described in detail with reference to FIG. 3. Depending on the realization, the server device 300, the transaction end device 400 as well as the portable data carrier 500 can be the transaction unit. The concrete representation in FIG. 1 is geared to the example of relaying the transaction data by the relay end device 200 via the server device 300 and the transaction end device 400 to the portable data carrier 500 as the transaction unit.

The data communication between the terminal device 100 and the relay end device 200 is carried out according to a known contactless (near-zone) communication protocol, for example according to ISO/IEC 14443, as it is known in connection with contactlessly communicating chip cards, or according to one of the NFC protocols ("Near Field Communication"; ISO/IEC 18092 (NFCIP-1); ISO/IEC 21481 (NFCIP-2)). The relay end device 200 comprises for this purpose a suitable data communication interface 210 which is described below with reference to FIG. 2.

Vis-à-vis the terminal device 100 the relay end device 200 pretends in a certain sense to be a portable data carrier, thus operates in a mode "being card". This mode is supported by the data communication interface 210 just as a mode "being reader" in which the device can pretend to be a terminal device vis-à-vis a portable data carrier 500.

Analogously, the data communication between the transaction end device 400 and the portable data carrier 500 is established. The transaction end device 400 possesses for this purpose a data communication interface 410 corresponding to the data communication interface 210 (cf. FIG. 4). However, here the transaction end device 400 operates as a terminal vis-à-vis the portable data carrier 500. The known technical details can be found for example in the book "RFID-Handbuch", 5th edition, Hanser Verlag, Munich 2008, chapter 11.6. According to an alternative embodiment the data carrier 500 can also be configured as a data carrier communicating in a contact-type fashion, which can be connected via a suitable reading device in a known way with the transaction end device 400.

The data communication between the relay end device 200 and the server device 300 as well as, if required, between the server device 300 and the transaction end device 400 is established via a suitable, known communication network. By way of example, in FIG. 1 there are represented a mobile radio network 1000 or the Internet 2000.

The server device 300 comprises various components. A registration server device 310 serves for registering various relay end devices 200 and/or transaction end devices 400 in the transaction system 10.

A relay end device 200 or a transaction end device 400 which wants to be part of the transaction system 10 can register with the server device 300 in a registration step. The relay end device 200 or the transaction end device 400 can be equipped for this purpose with a registration application which sets up a connection to the server device 300. Such an application can be installed on a security element of the corresponding device 200, 400 (cf. FIG. 2).

In so doing, for each of the devices 200, 400 registration data can be stored, for example a unique designation of the device 200, 400, a mobile radio number, an IP address or the like. On the basis of these data the server device 300 can subsequently authenticate the device 200, 400 and, where applicable, address it.

In principle, a suitably equipped end device 200, 400, for example a mobile radio end device, can play the role of a relay end device 200 as well as the role of a transaction end device 400 in the transaction system 10. Within the framework of the registration a corresponding role is chosen, whereas it is possible that an end device plays both roles, although not within the framework of the same transaction. It can further be defined, which relay end device 200 may be in principle switched with which transaction end device 400 for carrying out a transaction. A transaction end device 400 can define here, for example within the framework of the registration, that merely a firmly specified choice of uniquely identified relay end devices 200 may access in a fashion described hereinafter a transaction application of the transaction end device 400 or of a data carrier 500 connected therewith. On the other hand, a relay end device 200, for example, may define that the transaction data relayed by it are to be relayed by the server device 300 always to a preset transaction end device 400, if available. The described registration data are stored and managed by the registration server device 310.

In a further step described hereinafter, when a relay end device 200 logs in on the server device 300 in order to request transaction initialization data required in preparation for a transaction with a terminal device 100, the server device 300 makes available to the relay end device 200 these transaction initialization data. This can also be effected already within the framework of the registration. Content and importance of the transaction initialization data are described more precisely hereinafter.

An update server device 320 serves for updating, where applicable, data which are stored on the relay end device 200 or the transaction end device 400 for carrying out a transaction within the framework of the described transaction system 10. This can relate, for example, to the relay application 280, 480 or to individual transaction initialization data. Such an actualization is normally effected via the over-the-air interface (OTA) and is not noticed by a user of the corresponding end device 200, 400.

An application server device 330 makes available a series of different transaction applications 370. By means of this application server device 330 the server device 300 makes available the functionality of a transaction unit. The application server device 330 comprises a multiplicity of portable data carriers 350, which respectively support at least one transaction type, i.e. have a transaction application 370 for this transaction type. For different transaction types the server device accordingly makes available different portable data carriers 350. The application server device 330 can thus be enabled by a multiplicity of conventional portable data carriers 350 to carry out a great variety of transaction types.

The server device 300 manages data relating to the transaction units which can process relayed transaction data. It stores the data for example in the form of a list of the transaction units. Assigned to the transaction unit, a (relay) address is stored. The relay address is suitable for setting up (by the relay end device 200 or the server device 300) a data communication (via a network 1000,2000) with the transaction unit. For the transaction units it is in particular stated which transaction type or which transaction types they support. Further, for the transaction unit, at least for the transaction type, there is stored a unique identifier. Finally, there can further be stored a user assignment to the transaction units and, where applicable, user-specific specifications for the transaction units. These managed data are preferably captured by the registration server device 310.

The server device 300 is arranged through the switching server device 340 to choose a transaction unit from the stored transaction units. The choice is effected in dependence on one or a combination of the following choice parameters: the relay end device 200 (or its user and/or location), the transaction type or specifications of the owner of the transaction unit. The choosing is preferably effected upon inquiry by a relay end device 200. But it is also possible to choose a transaction unit in advance, for example for a certain transaction type on a relay end device at a known location.

The switching server device 340 can inform the relay end device about the relay address of the chosen transaction unit. The relay end device 200 sets up with the aid of the relay address a data communication with the chosen transaction unit. In FIG. 1 one has dispensed with a representation of the fact, however, that the relay end device 200 can thus set up via the mobile radio network 1000 and/or the Internet 2000 a connection, independent of the server 300, to the transaction end device 400 or the portable data carrier 500. In a rather extreme special case, the server device 300 might even inform the relay end device 200 that—despite of the relay option present—an application stored locally on the relay end device 200, e.g. the application AID1 of the security element 220, is to carry out the transaction.

The switching server device 340 is further arranged to relay transaction data relayed from the terminal device 100 via the relay end device 200 for a transaction to a transaction unit 450,500 that was chosen or is to be chosen. The switching server device 340 thus establishes for carrying out a transaction within the framework of the transaction system 10 an indirect data communication connection between a relay end device 200 and the transaction end device 400. Accordingly, in this realization the relay end device 200 does not need to be informed about the relay address.

In FIG. 2 a possible security structure of an end device 200, 400 is shown by the example of the relay end device 200. The transaction end device 400 can be equipped in the same way or similar.

Numerous transactions between the terminal device 100 and the server device 300, the transaction unit 450 or the data carrier 500 employ and process security-relevant or confidential data of a user, for example authentication data, money amounts or the like. It is therefore essential that transaction data relating to the transaction are securely stored and managed in the respective devices 200, 400 which relay or process the transaction data. For this purpose the corresponding end devices 200, 400 comprise various security elements (modules).

The data communication interface 210, which is configured as an NFC interface, may already comprise a security element itself, for example in the form of a secure memory card (not shown).

An end device 200 configured as a mobile radio end device comprises as a further security element a (U)SIM mobile radio card 220. This can have an antenna on its own (not shown) or be connected with the data communication interface 210 and serve the latter as a security element, where applicable.

A controller 230 of the end device 200 can comprise a region secured in a hardware-protected, software-based manner (for example according to the ARM TrustZone technology), which makes available a further security element. In this secured region security-relevant data can be processed in secure fashion under a substantially separate security operating system.

Finally, the end device 200 can comprise further known security elements, for example a secure memory card 250 or the like.

FIG. 3 schematically shows portions of the internal structure of the relay end device 200 and FIG. 4 portions of the transaction end device 400.

The SIM card 220 serving the relay end device 200 of FIG. 3 as a security element comprises a file EF_DIR known in the field of chip cards. Data contained therein, so-called application identifiers (AIDs), indicate which applications are supported by the device 200 or its SIM card 220. When, for example, the terminal device 100 sets up a data communication connection with the relay end device 200 and reads out the file EF_DIR, the terminal device 100 assumes that the relay end device 200 makes available the applications which are designated by the identifiers AID1, AID2, AID3 and AID4.

In actual fact, the relay end device 200 itself, as indicated in FIG. 3, merely supports a transaction application 270 which is identified as AID1. The entries AID2, AID3 and AID4 were made available to the relay end device 200 as transaction initialization data 260 in a login step, as hereinafter described in detail, by the server device 300. A terminal device 100 which, for carrying out a transaction, 200, awaits for example a transaction application designated with AID3 to be present on the relay end device, in the present case assumes that the relay end device 200 supports this transaction application and sends corresponding transaction data, for example in the form of known command APDUs. Since the relay end device 200 only "pretends" the functionality regarding the transaction application designated with AID3 by means of the entry in the file EF_DIR, the relay end device 200 relays the received commands by means of the relay application 280 to the server device 300 or a transaction unit 400, 500 (also cf. FIG. 7).

As it becomes clear also with the help of the further explanations, the relay end device relays transaction data to different transaction units, depending on the transaction type. The corresponding transaction applications are contained in the server device 300 for the AID4 and AID5, in the transaction end device 400 for AID2 and in the portable data carrier 500 for AID3.

In FIG. 3, the list of the transaction types supported by the relay end device is stored in the form of the file EF_DIR 260 in the security element 220 of the relay end device 200. The list can be provided, however, like the relay application, in other units of the relay end device 200. The list contains real entries of the transaction applications that are actually present locally, as well as virtual entries of the transaction applications that are (not present locally or only) available by means of relaying.

The relay end device relays the transaction data in transparent fashion, i.e. unchanged. Therefore, one can dispense with the security element 220 for the relaying. Normally, within the framework of the transaction there is set up a secure channel, i.e. an end-to-end encryption takes place, between the terminal device 100 and the transaction unit 300, 400, 500. The security element 220, however, is a suitable memory for example for the login data (account data) for the login of the relay end device 200 on the server device 300.

As already mentioned, at least the virtual entries of the list 260 can be made available by the server device 300—preferably in advance. The list 260 can here be dynamically adapted to a location of the relay end device 200 and, where applicable, updated in response to a change of location by the server device 300. The server device 300 can manage for the relay end device only the virtual entries or the complete list with virtual and real entries. Stored are only the real entries and, where applicable, a reference to the currently stored set of virtual entries for each relay end device 200 by the server device 300. The list 260 or at least the virtual entries thereof can also be queried from server 300 by the relay end device 200 only as needed, i.e. are not made available in advance.

As described hereinafter, a transaction application can be carried out on the server device 300 by means of the application server device 330, if this supports the transaction type in question (for example by the application 370, designated with AID4, cf. FIG. 1).

If not, the switching server application 340 is arranged to relay the transaction data to a suitable transaction end device 400 switched in the way described below. If the transaction end device 400 or its security element 450 supports the corresponding transaction application 470, designated with AID2, as indicated in FIG. 4, the transaction application 470 is executed there and a corresponding response command is transmitted via the switching server device 340 to the server device 300 and by means of the relay application 280 of the relay end device 200 to the terminal device 100.

If also the transaction end device 400 does not support the requested transaction itself, but the data carrier 500, as indicated for the case of the request of the transaction application AID3 in FIG. 4, a relay application 480 of the transaction end device 400, which substantially corresponds to the relay application 280 of the relay end device 200, can relay the transaction data (in the form of a command APDU) to the data carrier 500 (also cf. FIG. 7). There the transaction application AID3 is then finally executed. A corresponding response (response APDU) finds its way to the terminal device via the transaction end device 400, the server device 300 and the relay end device 200 through the intermediary of the relay application 480, the switching server device 340 and the relay application 280.

FIG. 4 shows components of a transaction end device 400 as well as the portable data carrier 500. In the transaction end device there are, inter alia, a security element 450 which can be designed like described hereinbefore and an interface for the contactless near-zone communication 410. Via the interface 410 the transaction end device can, for example, contactlessly communicate with the data carrier 500. The transaction end device 400 can be, similar to the relay end device, a mobile end device, such as a mobile radio device, a PDA or notebook. As a transaction end device there can also serve, however, a stationary device, such as a PC, network computer or a card reading device.

In the security element 450 of the transaction end device 400 there is disposed a transaction application 470 with the AID2. In the security element 450 of the represented realization there are further disposed a relay application 480 and a relay recognition 420. In particular the relay application 480, however, is normally not disposed in the security element, but in the transaction end device 400.

The relay application 480 relays the transaction data (command APDUs) received from the relay end device 200 to the application 470 with the AID2 in the security element or to the application with the AID3 in the portable data carrier 500. It sends back the response (response APDUs) of the application to the relay end device 200. The transmission path can be designed with or without integration of the server device 300.

The transaction application 470 of the security element 450 is arranged to carry out contactless transactions via the interface 410 with not shown terminal devices. Like the terminal device 100, also the transaction application 470 assumes that it is involved in a local transaction in the near zone. This assumption also applies to the portable data carrier 500, which as a local transaction partner can act in the near zone for example with the transaction end device 400 (in the mode "being reader"). To the transaction unit 450, 500 involved in the transaction there is thus transmitted in the present case a transaction endpoint signal. The transaction endpoint signal is provided in order to signal to the transaction unit 450, 500 that it carries out the transaction as a remotely disposed endpoint of a relayed transaction. In this context, more details regarding the relay recognition 420 are described below with reference to FIG. 7.

In the following, various embodiments of a transaction method are described on the basis of the transaction system 10 described with reference to the FIGS. 1 to 4. On account of the already explained multiplicity of variants, the respective realization will be described only by way of example, for example starting out from one of the variants.

In FIG. 5, essential steps or phases of a transaction method are represented in an overview. In particular the phases of registration S1, login S2, and transaction S3 can run temporally independent of each other. For example, after the one-time registration S1 there are effected the login S2 daily and thereafter any number of transactions S3.

In a first step S1, a registration step, it is required that the relay end device 200 and the transaction units 400, 500 register with the server device 300. This step has already been described in detail hereinabove with reference to the registration server device 310.

In step S2, an end device 200, 400, in particular a relay end device 200, logs in on the server device 300 for a subsequent transaction (cf. step S3). In so doing, in substep TS21 the role of the end device is defined for the transaction, i.e. it is determined, whether an end device is involved as a relay end device 200 or as a transaction end device 400 in the transaction. This substep can also be carried out already during the registration, where applicable, if a device wants to operate always only as a relay end device 200 or only as a transaction end device.

In substep TS22 the server device makes available to the relay end device 200 transaction initialization data. These serve for making possible or simplifying setting up a data communication between a terminal device 100 and the relay end device 200 in substep TS31 during an initialization phase.

So as to permit the importance of the transaction initialization data to be better explained, there will hereinafter be described in short with reference to FIG. 6 the course during such an initialization phase for setting up the corresponding data communication connection, before then, again with reference to FIG. 5, various types of transaction initialization data will be described.

A terminal device 100 usually expects a contactlessly communicating data carrier 500 as a transaction partner. Hence, the procedure upon setting up the data communication connection, as it is represented in FIG. 6 in the steps T1 to T8, is illustrated for the case that the relay end device 200 quasi pretends to be a contactless communicating chip card of the type A (according to ISO/IEC 14443). A setting up of a data communication with a type B data carrier runs in a deviating manner, but basically similar.

In the step T1, the relay end device receives a REQUEST command, to which it responds in the step T2 with a specified ATQ command ("ANSWER TO REQUEST"). The subsequent steps T3 to T6 serve for choosing the relay end device 200 by the terminal device 100. This is necessary, because several communication partners may simultaneously be located within range of the terminal device 100. This must be in a position, and in step T3 there is started an anti-collision procedure for this purpose, to identify and address in targeted fashion each single one of these possible communication partners with the help of a unique identifier, the UID sent for this purpose by the relay end device 200 in step T4. After receipt and recognition of the identifier UID the terminal device 100 finally chooses the relay end device 200 in step T5 for the further data communication, i.e. for carrying out a transaction. This is confirmed by the terminal device in step T6. The steps T1 to T6 merely serve for choosing the relay end device and are independent of a subsequently executed transaction.

The steps T7 and T8 are also transaction-independent. The data set ATS ("answer to select") requested by the terminal device 100 in step T7 and made available in step T8 by the relay end device 200 substantially describes protocol parameters of a type A data carrier, with which the terminal device 100 believes to set up a data communication due to the behavior of the relay end device 200. Corresponding to this data carrier might be for example the data carrier 500, with which the terminal device 100 actually carries out a transaction with the associated transaction application 570 with the AID3 afterwards (cf. FIG. 7, steps T11 to T18). A parameter of the ATS data set, the "FWI" ("frame waiting integer"), defines, for example, the maximum waiting period, which the terminal device 100 (in the transaction phase following the initial phase) after sending out a command has to wait for the response of the data carrier. After expiry of this time span a so-called "timeout" error occurs. In addition, the ATS data set comprises manufacturer-specific fields, so-called "historical bytes", which can comprise freely definable information.

In principle, it would be possible that the relay end device 200 relays all the commands received from the terminal device 100 by means of the relay application 280 in the steps T1, T3, T5 and T7 via the switching server device 340 of the server device 300 and the relay application 480 of the transaction end device 400 to the data carrier 500 (or to the application server device 340 or the transaction end device 400, if these make available the transaction application). The data carrier 500 would then have sent, just as if it had directly set up—i.e. without the described relaying—a data communication with the terminal device 100, corresponding response commands, which would have been relayed in the reverse way again to the terminal device 100.

However, it is required according to the described communication protocol that individual ones of the response commands reach the terminal device 100 within exactly specified, tightly dimensioned time intervals, so as to be accepted as valid response commands. This applies in particular to ATQ (step T2) and the responses to the anti-collision inquiries (step T4). A relaying of the inquiry commands and response commands to and from the data carrier 500 can readily lead, because of the data transmission and relay periods that occur, to the fact that the required time limits are exceeded and thus setting up the data communication to the terminal device 100 fails.

In the ideal case, the steps T1 to T8 are not only transaction-independent, i.e. are the same for different transaction types, but are specified steps for setting up the communication connection according to a protocol layer (i.e. e.g. according to ISO 14443). Only in the further steps T9-T10 and section A or T9'-T12' and section B transaction data are transmitted. Transaction data in the context herein are data of an application layer, which can also be referred to as application protocol data. Such APDUs (Application Protocol Data Units) are sent as command APDUs or response APDUs. The data of the protocol layer transmitted in the initialization phase can accordingly be referred to as transport protocol data.

The complete ISO/IEC 14443 protocol stack is handled in the relay end device 200 also during the points in time T9-T12 or T9'-T12'. Merely the application protocol data (normally encoded according to ISO/IEC 7816) embedded in the transport protocol ISO/IEC 144443 will thus be relayed in transparent fashion to the transaction unit. The application protocol data are relayed by the relay end device 200 via a network connection to a transaction unit 300, 400 or 500.

The network connection is set up T51 by the relay end device 200 in response to a selection T5 or T9 by the terminal device 100. In step T5 the relay end device 200 is selected as a communication partner and in step T9 a transaction application (by stating the AID). To set up the network connection timely, i.e. before the receipt of transaction data which require a transaction-dependent response, facilitates the compliance with the specified waiting periods when making available responses (A-APDUs) to relayed transaction data (K-APDUs).

The relay end device 200 is equipped with transaction initialization data by the server device 300 in substep TS22 (cf. FIG. 5). Said data can serve the relay end device 200 for carrying out the steps T1 to T8 of FIG. 6 without checking back with the server device 300, the transaction end device 400 or the data carrier 500. In this way, "timeout" errors can be avoided.

The relay end device 200 could receive a complete protocol stack of the corresponding communication protocol which determines the data communication between the relay end device 200 and the terminal device 100 as transaction-independent transaction initialization data, for example, from the server device 300. This enables the relay end device 200 to communicate directly with the terminal device 100, in particular according to the steps T2 and T6. Normally, however, the relay end device 200 is already arranged to carry out the steps according to the protocol.

Further transaction-independent transaction initialization data are the identifier UID transmitted in step T4 and/or the ATS data set transmitted in step T8. In the case of a type B data carrier, similar data sets are provided, for example within the framework of a so-called ATTRIB prefix which likewise comprises data carrier parameters and an identifier.

The server device 300 can make available to the relay end device 200 the corresponding transaction initialization data (UID, ATS) in the substep TS221 of FIG. 5. Said data can be suitably generated by the server device 300, for example in case the server device 300 itself serves as the transaction end device—by means of the application server device 340. On the other hand, when a switching of the data communication to a transaction end device 400 or a data carrier 500 via a transaction end device 400 is provided, the transaction initialization data (UID, ATS) of the server device 300 could have been made available to the transaction end device 400 in advance, for example upon the registration (S1) or login (S2; TS21) of the transaction end device 400. I.e. the server device 300 then makes available to the relay end device 200 for example the UID and ATS of the data carrier 500. Making available these transaction initialization data can be performed, where applicable, also already in the registration phase (step S1). This holds in particular when at this point in time from the point of view of a registering relay end device 200 it is already certain by means of which transaction end device 400 a later transaction is to take place under the relaying of transaction data by the relay end device 200.

Optionally, as indicated in the step TS222 of FIG. 5, also transaction-dependent transaction initialization data can be made available to the relay end device 200 by the server device 300 already during the login. These data directly relate to a transaction application to be subsequently executed, for example a transaction application designated with AID3. A simple embodiment of transaction-dependent transaction initialization data are identifiers (AIDs) of the corresponding applications. These were already described with reference to FIG. 3. If the relay end device 200 comprises, for example, in a corresponding directory EF_DIR the application identifier AID3, there is no need for the relay end device to check back with the server device 300, when the terminal device 100 at the beginning of a transaction phase (cf. FIG. 6, steps T9, T10) following the initialization phase chooses an application. The relay end device 200 confirms the selection of the application T9 with a simple positive response T10 "ok". This response of a transaction application to a selection is largely transaction-independent. Through this realization the relay end device gains time to set up the network connection T51 in response to the application selection T9. Only the further transaction data of the phase A need a transaction-dependent response of the transaction unit and thus a relaying. For the few exceptional cases, in which the relay end device 200 should not only simply acknowledge but relay the selection T9, the relay end device 200 can be accordingly instructed with the aid of the transaction initialization data.

If a making available of transaction-dependent transaction initialization data in step S2 is omitted, measures corresponding to the substep TS222 can be performed at a later point in time, as this is illustrated in FIG. 6 with reference to the steps T9' to T12'. If in step T9' the terminal device wants to choose an application AID5 for which the relay end device 200 has hitherto had no identifier entry, this relays the received command to the server device 300 in step T10'. That is, the relay end device 200 is generally arranged to relay identification information relating to a transaction application to the server device 300, here the SELECT(AID5) command received from the terminal device 100. The relay end device 200 is also arranged to request transaction-dependent transaction initialization data from the server device 300. The relaying of the SELECT(AID5) command simultaneously means a requesting of the transaction initialization data required on the part of the relay end device 200 for responding to the commands.

The server device 300 later delivers, comparable to the above-described, corresponding transaction initialization data in step T11', which data the relay end device 200 finally relays in the desired way in step T12' to the terminal device 100.

The server device 300 could additionally make available to the relay end device 200, for example in the steps TS222 (cf. FIG. 5) or T11' (cf. FIG. 6), executable portions of the corresponding transaction application as further transaction-dependent transaction initialization data. In this way, executing the transaction can subsequently be accelerated, because individual portions of the transaction application can be executed in the relay end device 200 itself and accordingly a smaller number of data must be relayed between different transaction devices. Security-relevant portions of a corresponding transaction application, however, are preferably always carried out in the server device 300, i.e. the application server device 330, or the transaction end device 400 or the data carrier 500 connected therewith, where applicable.

The latter is not the preferred realization, however, because the transaction procedure proper for all the parties involved, i.e. also for the transaction unit, is to remain unchanged as far as possible. Transaction data are therefore always relayed and only handled and responded to remotely in the transaction unit.

The making available of transaction-dependent transaction initialization data, in particular an installing of executable portions of a transaction application in the relay end device 200 by the server device 300, can be made dependent on an approval of a user of the relay end device 200. Alternatively or depending on the type of the transaction initialization data to be installed, however, also an automatic installation can be provided, which requires no user interaction.

On the part of a transaction end device 400 which logs in in step S2 specifications can be made, which relate to a forthcoming transaction relayed by the relay end device. For example, depending on the transaction or the identity of the relay end device an access to an electronic purse on the transaction end device 400 can be prohibited or limited in a suitable manner. Other specifications are possible.

With reference to the FIGS. 6 and 7, there will hereinafter be described individual steps and various embodiments of the transaction method within the framework of the step S3 of FIG. 5, i.e. within the framework of the transaction proper with the terminal device 100.

During the initialization phase for setting up a data communication already described above with reference to the steps T1 to T8 the relay end device 200 can transmit relay information WLI to the terminal device 100. With said information the relay end device 200 indicates to the terminal device 100 that it is arranged to relay transaction data, in particular transaction commands in the form of APDUs, to a remote transaction unit 300, 400 or 500. The relaying is supported in the relay end device 200 by the relay application 280.

The relay information is transmitted preferably in the form of the transaction initialization data UID, ATS to the terminal device 100. The relay end device 200 has previously (cf. substep TS22; FIG. 5) received this transaction initialization data from the server device 300. The relay information WLI can for example be transmitted by means of the UID in such a way that a specified number range of UIDs which is known to the terminal device 100 is reserved for those relay end devices 200 which support a relaying of transaction data. The server device 300 can thus assign such a "relay UID" to the relay end device 200 in substep TS22. The relay end device 200 then indicates in step T4 the "relay UID" instead of its own device-specific UID. In this way, the relay information WLI can be transmitted to the terminal device 100 in an effective manner and without the necessity of a protocol adaptation or protocol change.

According to an alternative embodiment, the relay information WLI can also be transmitted, as indicated with reference to step T8, by means of the ATS to the terminal device 100, for example with the aid of the above-described "historical bytes".

The relay information WLI can be transmitted to the terminal device 100 by the relay end device 200 also at a different point in time, however, for example after the termination of the initialization phase, and in a different suitable manner, for example by means of a command specifically defined therefor. For this purpose, the terminal device 100 could for example before the beginning of the data communication proper, after step T8, send to the relay end device 200 a command which serves for querying the relay capability of the relay end device 200.

By means of the ATS, parameters determining the subsequent data communication can be adjusted independently of the relay information WLI on the part of the relay end device 200. Since the relay end device 200 has previously received the ATS data as transaction initialization data from the server device 300, it is therefore incumbent on the server device 300 to adjust suitable parameters for a subsequent transaction. This relates in particular to statements on the maximum time, which the terminal device 100 has to wait, after sending a command, for the response of the relay end device 200. A corresponding parameter, for example the hereinabove described ATS parameter "FWI" ("frame waiting integer") can be adjusted so high on the part of the server device 300, that avoidable errors do not occur at this point on account of the relaying of transaction data. The permissible response time of the relay end device 200 vis-à-vis the terminal device 100 can thus be extended on the part of the server device 300.

In a step T81, the terminal device recognizes with the help of the received relay information that the supposed transaction partner disposed locally (in the near zone) is a relaying unit. With the help of the relay information it can distinguish between relaying units and local transaction units. It recognizes thus with the help of the relay information that the locally disposed device itself cannot execute the transaction. The terminal device 100 reacts to this with adapted or additional preparation steps for the transaction.

First, the terminal device 100 decides whether it wants to carry out the transactions. If the terminal device 100 has for example stored as a security specification that its (or the current) transaction type may be executed only with local transaction units, it does not continue the transaction. In the present case, the terminal device decides to carry out the transaction. Another security specification prescribes to the terminal device to set the maximum amount (transaction limit) to a smaller value as for local transactions.

Departing from the behavior of the conventional terminal devices, the present terminal device 100 recognizes a relaying and carries out the transaction nevertheless, instead of aborting it or rendering it invalid otherwise. Further defense and/or recognition mechanisms for relayings, which are possibly present in the terminal device, can then be turned off. Known approaches are in this context runtime measurements, distance measurements or specifically adapted transaction protocols.

As a particularly important preparation step there is effected an adapting of the communication parameter waiting period for the exchange of the transaction data. The waiting period could also be increased in additional communication steps upon inquiry of the relay end device, but is here to be adapted automatically and thus faster in the terminal device upon a recognized relaying.

In the shown example of FIG. 6, the relay information is transmitted in the transmission protocol data. It is transaction-independent, i.e. it holds for all transaction types. Preferably, however, the relay information is transmitted for a selected transaction type. This would be possible for example in step T10. The relay information can be transferred either in the transmission protocol data of the step T10, in which the transaction data are transmitted, or in the transaction data themselves (response: "ok"). For example, the ISO 78164 readily allows differently encoded responses, which all correspond to a positive acknowledgement "ok".

With reference to FIG. 7, the steps T11 to T18 illustrate the carrying out of a transaction between the terminal device 100 and the data carrier 500. The associated transaction data, command APDUs and response APDUs are here relayed via the relay end device 200 between the terminal device 100 and the server device 300 (steps T12, T18). The server device 300 in turn switches by means of the switching server device 340 a data communication connection between the relay end device 200 and the transaction end device 400 (steps T13, T17). The transaction end device 400 in this embodiment uses the data carrier 500 for carrying out the transaction application (AID3). Here, the transaction end device 400 operates as a second relay end device in a certain sense by relaying the command APDUs to the data carrier 500 in step T14 and relaying response APDUs received in step T15 again to the server device 300 in step T16.

Alternatively (not shown), in the case in which the transaction end device 400 comprises a transaction application, for example AID2, to be executable itself (cf. FIG. 4), the steps T14 and T15 can be omitted, since the transaction application can be executed directly in the transaction end device 400. The remaining procedure is as described. In particular, it is transparent for the remaining transaction devices, whether the transaction end device 400 executes the transaction application itself or with the aid of the data carrier 500.

Likewise not shown are the alternatives in which the relay end device 200 relays the transaction data without integration of the server 300 to and from the transaction unit 400, 500.

According to a further embodiment, which is described in FIG. 7 with reference to the steps T13' to T16', an execution of a transaction application, for example AID5, can also be carried out in the server device 300 by means of the application server device 330. Here, a separate transaction device 400 and in particular a data carrier 500 are dispensable or not integrated. The application server device 330 makes available preferably a plurality of transaction applications AID4, AID5 (cf. FIG. 1) and can thus support many different transactions vis-à-vis many different terminal devices 100. It is the most elegant when the application server device 330 has a multiplicity of conventional portable data carriers 350 for one or several transaction types, which can accordingly be employed via a contactless reading device (construction and function similar to FIG. 4) or several contactless reading devices as transaction units.

If upon the relaying or processing of the transaction data there arises a time delay in the server device 300 or the transaction end device 400, which would result in an error in the data communication between the relay end device 200 and the terminal device 100, it can be provided that the relay end device 200 sends a corresponding inquiry to the terminal device 100, (in FIG. 7 not shown) regarding an extension of the response interval within which a response command is received at the terminal device 100. According to the ISO/IEC 14443 protocol this can be made by means of a "frame-waiting-time-extension" inquiry (FWX).

In the above-described embodiments of the transaction method the relay end device 200 is respectively arranged to relay transaction information, i.e. identification information relating to the transaction application, to the server device 300. Such identification information can be, for example, an application identifier (AID; AFI, "application family identifier" for type B data carriers) or the like. In this way, the relay end device 200 becomes multi-application-capable, without itself making available a single transaction application installed in an executable manner on the relay end device 200. With the help of the identification information the server device 300 recognizes which transaction application is required. If this is supported by the application server device 330, it can be executed already there. In the other case, the switching server device 340 can relay corresponding transaction data to such a transaction end device 400 which supports, possibly by means of a data carrier 500, the corresponding transaction application. The evaluation of the identification information and the following processing is incumbent, as described, on the server device 300.

As indicated with reference to step T12 in FIG. 7, it can be provided, that the relay end device 200 sends a choice information AI for choosing a specified transaction end device 400 to the server device 300. The choice information AI is processed by the switching server device 340 and taken into account upon switching the corresponding transaction end device 400 chosen on the part of the relay end device 200. It is also possible that corresponding choice information AI is transmitted to the server device 300 already in the registration phase (S1; FIG. 5) or the login phase (S2; FIG. 5). In this way a user of the relay end device 200 can specify, preferably transaction-dependent, via which transaction end device 400 a certain transaction is to be respectively carried out. The choice information AI, however, can be designed such that it alternatively enables the relay end device 200 to set up a direct connection to the transaction unit (without integration of the server device).

As shown with reference to step T13 in FIG. 7 and step T91 in FIG. 6, a transaction endpoint signal TES can be transmitted to the transaction unit. The step 91 that is alternative to the transmission of the transaction endpoint signal TES in step T13 is described later.

In step T13, the server device 300 transmits a transaction endpoint signal TES to the transaction end device 400. With the help of such a transaction endpoint signal TES the transaction end device 400 can recognize that it operates as the transaction endpoint of a chain of transaction devices 200, 300, 400. The role of the transaction endpoint signal is thus similar to that of relay information. For recognizing and further processing the transaction endpoint signal TES the transaction end device 400 comprises a relay recognition 420 on a security element SE 450 (cf. FIG. 4).

Recognizing the operating as a transaction endpoint in a relayed transaction is advantageous for various reasons. For example, a certain transaction, which is carried out locally in the described manner via a contactless data communication, is regularly not recognizable for the user of a transaction end device 400. In the usual transaction systems for near-zone solutions it is rather assumed that the user brings his portable data carrier 500 or his end device 400 having the security element 450 into the near zone of the transaction terminal and thus triggers the transaction. Also in the present systems approach this requires no further interaction of the user, assumed that the transaction end device 400 is online and has previously been properly registered with and logged in on the server device 300.

It can therefore be provided that the relay recognition 420 requests a release by a user for the relayed transaction which upon local (conventional) execution does not require a user approval. It can further be provided to obtain a relay approval for transaction types with/or without conventionally provided release by a user, with which the user explicitly approves the relaying of the transaction data. The user of the transaction end device 400 must actively approve a carrying out of the transaction before this is executed, for example by operating a key or the like. It can also be provided, however, that the transaction is always carried out when the user of the transaction end device 400 does not actively interrupt (passive release) the transaction announced to the user by the triggered transaction endpoint signal TES.

The transaction endpoint signal TES can additionally comprise information which indicates via which further transaction devices 200, 300 the transaction is to be carried out. In particular, the transaction endpoint signal TES can comprise authentication information relating to the server device 300 or the relay end device 200. The transaction unit 350, 450, 500 can then authenticate the server device 300 or the relay end device 200. A corresponding authentication message can be indicated to a user of the transaction end device 400. Said user can then approve or not a transaction, for example depending on the identity of the respective device. It is also possible that in the transaction end device 400 presettings were made which define that upon receipt of a transaction endpoint signal TES a notification of the user can be omitted, when the transaction has been relayed via transaction devices that were authenticated with the help of the transaction endpoint signal TES and preset to be permissible.

Also the transaction unit can comprise defense measures against relay attacks. Upon recognition of a relayed transaction indicated by a transaction endpoint signal TES, these (in some cases very elaborate) defense measures are deactivated.

Moreover, upon the presence of a transaction endpoint signal TES the transaction unit may check security specifications for relayed transaction. Where applicable, the transaction unit accordingly refuses such a relayed transaction. Preferably, however, preparatory to the transaction it executes the following adaptations. The priority of the transaction application for execution on the transaction unit is increased. Thus, the response time of the transaction unit is optimized. For example, a priority level (in the operating system of the transaction unit) can be increased.

A transaction endpoint signal TES can be generated, as shown in FIG. 7, by the server device 300. Alternatively, the transaction endpoint signal TES is generated in the relay end device 200. In general, the transaction endpoint signal is transmitted as data of an application layer and received by the transaction unit preferably before the transaction data.

FIG. 6 shows a particularly advantageous realization, in which the relay end device 200 generates the generated transaction endpoint signal TES in response to a first command T9 within the transaction and sends it to the transaction unit in step 91. Since the relay end device 200 directly responds T10 to the first received command T9 without relaying, the transaction unit 350, 450, 500, after the recognition of the received transaction endpoint signal TES, gains time to carry out the corresponding preparation steps.

With step T91 there is set up, once the transaction type and thus the transaction partner (in the relay end device 200 or the server unit 300) is determinable, the communication connection to the transaction unit 350, 450, 500. As indicated by step T92 in FIG. 6, the data carrier 500 recognizes the transaction endpoint signal TES and reacts thereto as described above.

The transaction endpoint signal can be transmitted in the form of a modified transaction choice signal to the transaction device. From the non-relayed transaction data "Select AIDS" there can be generated a modified choice signal "Select AID-TES-3", which is transmitted to the transaction unit in step T91. The relay recognition is selected by this K-APDU, carries out the preparation steps and then (internally) selects the transaction application AID3 on the transaction unit.

Further alternatively, the transaction endpoint signal TES could also be generated in the relay application 480, which is disposed in the transaction end device 400 or in the security element 450 thereof. But this variant is less secure and may be more complex technically.

The relay recognition 420 is preferably a separate (software) component of the security element 450 or of the portable data carrier 500. The changed behavior of the transaction unit, which was described above in more detail, after the recognition of a transaction endpoint signal can also be described as follows. When the transaction unit receives a transaction endpoint signal, it shifts into a relay mode and executes the (unchanged) transaction application in this mode. Thus, the conventional transaction application 470 can be retained unchanged in the transaction unit 450 or in the portable data carrier 500.

The invention claimed is:

1. A system comprising:
   a terminal device configured to contactlessly communicate in a near zone to carry out a commercial transaction with transaction partners disposed in the near zone, said transaction partners including a first transaction unit and a second transaction unit;
   a relay end device arranged to set up a contactless data communication with the terminal device in the near zone and to relay transaction data pertaining to the commercial transaction received from the terminal device to at least the first transaction unit or the second transaction unit, the first transaction unit and the second transaction unit being remotely disposed; and
   a server device configured to selectively switch a connection of the relay end device to the first transaction unit or the second transaction unit depending on the type of commercial transaction for the terminal device to transact with the first transaction unit or the second transaction unit as if the first transaction unit or the second transaction unit were in the near zone.

2. The system according to claim 1, wherein the server device chooses one of a multiplicity of transaction units.

3. The system according to claim 1, wherein the server device stores for transaction units which transaction type is supported.

4. The system according to any of claim 1, wherein the server device stores for transaction units with which address a data communication connection to the respective transaction unit can be set up.

5. The system according to claim 1, wherein the server device is arranged to switch the transaction unit by setting up a data communication connection to the transaction unit and relaying transaction data from the relay end device via the server device to the transaction unit.

6. The system according to claim 1, wherein the server device is arranged to switch the transaction unit by transmitting a data communication address of the transaction unit to the relay end device.

7. The system according to claim 1, wherein the server device comprises transaction units for different transaction types, wherein the relayed transaction is carried out with one of the transaction units of the server device.

8. The system according to claim 1, wherein the server device stores for transaction units with which relay end devices the transaction unit may be switched.

9. The system according to claim 1, wherein the server device is arranged to make available to relay end devices transaction initialization data.

10. The system according to claim 1, wherein the server device is arranged to determine the transaction type with the help of information received from the relay end device.

11. The system according to claim 1, wherein the server device is arranged to determine the transaction type with the help of position information which indicates the position of the relay end device.

12. A server device adapted to a system according to claim 1.

13. A server device configured to switch via a relay end device a transaction between a first transaction unit and a terminal device, the terminal device being configured to contactlessly communicate in a near zone to carry out a commercial transaction with transaction partners disposed in the near zone, said transaction partners including the first transaction unit and a second transaction unit,
   wherein the server device is arranged to switch a data communication connection between the relay end device and the first transaction unit, the data communication connection being necessary to carry out the commercial transaction, with the second transaction unit being remotely disposed, depending on the commercial transaction type for the terminal device to transact with the first transaction unit or the second transaction unit as if the first transaction unit or the second transaction unit were in the near zone.

14. A relay end device configured to support a commercial transaction between a contactlessly communicating terminal device and a transaction unit, the terminal device being configured to contactlessly communicate in a near zone to carry out a commercial transaction with transaction partners disposed in the near zone, said transaction partners including the first transaction unit and a second transaction unit,
   wherein the relay end device comprises a first data communication interface for a contactless data communication with the terminal device disposed in the near zone and a second data communication interface for a data communication with a server device,
   wherein the relay end device is arranged to relay transaction data pertaining to the commercial transaction received from the terminal device to at least a first transaction unit or a second transaction unit, the first transaction unit and the second transaction unit being remotely disposed, and
   wherein the relay end device is arranged to receive transaction-dependent transaction initialization data from the server and to employ the received transaction initialization data for a relayed transaction between the terminal device and the first transaction unit or the second transaction unit, depending on the type of commercial transaction as if the first transaction unit or the second transaction unit were in the near zone.

15. The relay end device according to claim 14 arranged for a system comprising a terminal device contactlessly communicating in the near zone for carrying out transactions with transaction partners disposed in the near zone, a relay end device which is arranged to set up a contactless data communication with the terminal device and to relay transaction data received from the terminal device to a remotely disposed transaction unit, wherein a server device which switches the relay end device with the transaction unit as a transaction partner for the terminal device, depending on the type of transaction.

* * * * *